US011050098B2

(12) United States Patent
Amouzegar et al.

(10) Patent No.: US 11,050,098 B2
(45) Date of Patent: Jun. 29, 2021

(54) PROCESS FOR THE RECYCLING OF LITHIUM BATTERY ELECTRODE MATERIALS

(71) Applicant: HYDRO-QUÉBEC, Montreal (CA)

(72) Inventors: Kamyab Amouzegar, Mont-Royal (CA); Patrick Bouchard, Shawinigan (CA); Nancy Turcotte, St-Tite (CA); Karim Zaghib, Longueuil (CA)

(73) Assignee: HYDRO-QUÉBEC, Montréal (CA)

( * ) Notice: Subject to any disclaimer, the term of this patent is extended or adjusted under 35 U.S.C. 154(b) by 123 days.

(21) Appl. No.: 16/303,268

(22) PCT Filed: May 19, 2017

(86) PCT No.: PCT/CA2017/050611
§ 371 (c)(1),
(2) Date: Nov. 20, 2018

(87) PCT Pub. No.: WO2017/197528
PCT Pub. Date: Nov. 23, 2017

(65) Prior Publication Data
US 2019/0207275 A1    Jul. 4, 2019

Related U.S. Application Data

(60) Provisional application No. 62/339,470, filed on May 20, 2016.

(51) Int. Cl.
*H01M 10/00* (2006.01)
*H01M 10/54* (2006.01)
(Continued)

(52) U.S. Cl.
CPC ............. *H01M 10/54* (2013.01); *C01B 25/45* (2013.01); *C22B 7/00* (2013.01); *C22B 7/006* (2013.01);
(Continued)

(58) Field of Classification Search
CPC ............. H01M 10/54; H01M 10/0525; H01M 10/052; C01B 25/45; C22B 7/006; C22B 26/12; Y02W 30/84; Y02P 10/234
(Continued)

(56) References Cited

U.S. PATENT DOCUMENTS 8,067,107 B2    11/2011    Sloop et al.
9,834,827 B2 *  12/2017    Wang ...................... C22B 7/006
(Continued)

FOREIGN PATENT DOCUMENTS

CN    103474718 A  *  12/2013
WO    2012007619 A1    1/2012

OTHER PUBLICATIONS

Machine translation of CN 103474718 A. (Year: 2013).*
(Continued)

*Primary Examiner* — Steven J Bos
(74) *Attorney, Agent, or Firm* — Buchanan Ingersoll & Rooney P.C.

(57) ABSTRACT

A process for the recycling of an electrochemically active material is described. The process comprises the steps of reacting the electrochemically active material with an oxidizing agent or a reducing agent in a solvent without addition of a strong acid, to produce a lithium salt and a delithiated electrochemically active material precipitate. This precipitate is separated from the lithium salt and used in the regeneration of the electrochemically active material.

26 Claims, 10 Drawing Sheets

(51) Int. Cl.
  *C22B 26/12* (2006.01)
  *C22B 7/00* (2006.01)
  *C01B 25/45* (2006.01)
  *H01M 10/052* (2010.01)
  *H01M 10/0525* (2010.01)

(52) U.S. Cl.
  CPC ............ *C22B 26/12* (2013.01); *H01M 10/052* (2013.01); *H01M 10/0525* (2013.01); *Y02P 10/20* (2015.11); *Y02W 30/84* (2015.05)

(58) Field of Classification Search
  USPC .......................................... 429/49; 423/179.5
  See application file for complete search history.

(56) References Cited

U.S. PATENT DOCUMENTS

| | | | | |
|---|---|---|---|---|
| 2005/0069484 | A1* | 3/2005 | Manev | C01D 15/02 423/594.15 |
| 2013/0287654 | A1* | 10/2013 | Yamada | H01M 10/54 423/179.5 |
| 2013/0302226 | A1* | 11/2013 | Wang | H01M 4/52 423/50 |

OTHER PUBLICATIONS

Abstract of CN 103474718 A. (Year: 2013).*
Bian, D. et al."A novel process to recycle spent LiFePO4 for synthesizing LiFePO4/C hierarchical microflowers" Elsevier, Electrochimica Acta, vol. 190, 2016, pp. 134-140.
Lee, C. K. et al."Reductive leaching of cathodic active materials from lithium ion battery wastes" Elsevier, Hydrometallurgy, vol. 68, 2003, pp. 5-10.
Cai, G. et al."Process Development for the Recycle of Spent Lithium Ion Batteries by Chemical Precipitation" ACS Publications ©, American Chemical Society, Eng. Chem. Res. vol. 53, 2014, pp. 18245-18259.
Gaines, I. et al."Costs of Lithium-Ion Batteries for Vehicles" Transportation Technology R&D Center, Center for Transportation Research, Argonne National Laboratory, May 2000, 73 pages.
Mantuano, D. P. et al."Analysis of a hydrometallurgical route to recover base metals from spent rechargeable batteries by liquid-liquid extraction with Cyanex 272" Journal of Power Sources , vol. 159, 2006, pp. 1510-1518.
Zou, H. "Development of a Recycling Process for Li-Ion Batteries" Worcester Polytechnic Institute, Apr. 2012, 56 pages.
Sohn, J.S. et al."Advanced processing of metals and materials" Sohn International Sympoisum Proceedings, Aug. 27-31, vol. 6, 2006, pp. 135-143.
Li, L. et al."Recovery of metals from spent lithium-ion batteries with organic acids as leaching reagents and environmental assessment" Elsevier, Journal of Power Sources, vol. 233, 2013, pp. 180-189.
Gaines, L. et al."Life-Cycle Analysis for Lithium-Ion Battery Production and Recycling" 90th Annual Meeting of the Transportation Research Board, Jan. 2011, 17 pages.
Zhang, P. et al."Hydrometallurgical process for recovery of metal values from spent lithium-ion secondary batteries" Elsevier, Hydrometallurgy, vol. 47, 1998, pp. 259-271.
Castillo, S. et al."Advances in the recovering of spent lithium battery compounds" Elsevier, Journal of Power Sources, vol. 112, 2002, pp. 247-254.
Shin, E.J. et al."A green recycling process designed for LiFePO4cathode materials for Li-ion batteriest" Journal of Materials Chemistry A, J. Mater Chem A. 2015, vol. 3 , pp. 11493-11502.
Tong, D. et al."Recy cling of LiCoO2 cathode mate rials from spent lithium ion batteries" Journal of Chemical Industry and Engineering (China), vol. 56, No. 10, Oct. 2005, 4 pages. (With English Abstract).
Liu, Y. et al."Supercritical CO2 extraction of organic carbonate-based electrolytes of lithium-ion batteries", RSC Advances, Issue 97, 2014, 1 page.
International Search Report (PCT/ISA/210) dated Aug. 24, 2017, by the Canadian Patent Office as the International Searching Authority for International Application No. PCT/CA2017/050611.
Written Opinion (PCT/ISA/237) dated Aug. 24, 2017, by the Canadian Patent Office as the International Searching Authority for International Application No. PCT/CA2017/050611.
Sun, L. et al.Organic oxalate as leachant and precipitant for the recovery of valuable metals from spent lithium-ion batteries Elsevier, Waste Management, vol. 32, (2012), pp. 1575-1582.
Extended European Search Report dated Apr. 3, 2020, issued by the European Patent Office in corresponding European Application No. 17798465.5-1108, with English-language translation, (19 pages).

* cited by examiner

PROCESS FOR THE RECYCLING OF LITHIUM BATTERY ELECTRODE MATERIALS

PRIORITY APPLICATION

The present application claims priority, under the applicable law, to U.S. provisional application No. 62/339,470 filed on May 20, 2016, the content of which is incorporated herein by reference as a whole for all purposes.

TECHNICAL FIELD

The technical field generally relates to a process for the recycling of electrode materials from lithium batteries, and more particularly for the recycling of used lithium metal and lithium ion batteries.

BACKGROUND

Lithium batteries are extensively used in technological fields such as home electronics or automobile propulsion. However, the disposal of such batteries at the end of their useful life can be dangerous regarding both safety and environmental considerations. In addition, high material costs involve expensive processes for the manufacturing of lithium batteries. That is why there is a need for the development of efficient processes for the dismantling and recycling of lithium battery materials.

Generally, discharged batteries must first undergo a deactivation step to minimise any danger associated with residual stored energy. Several strategies such as a cryogenic approach (Cost of lithium-Ion Batteries for Vehicles, Linda Gaines and Roy Cuenca, *Argonne National Laboratory*, September 2000) or handling under inert atmosphere have been used. The solvent may be recovered either by evaporation or by other means, such as the use of critical $CO_2$ as solvent (Yuanlong Liu et al., *RSC Advances*, 2014, 97, 54525-54531; and U.S. Pat. No. 8,067,107).

Once deactivation is ascertained, crushing and shredding steps followed by sorting and sieving operations allow for mechanical separation of the outer case, separator, and electrodes of the lithium batteries. The separation of the electrode material and of the current collector foil is achieved either by the dissolution of the binder in an appropriate solvent (Tong Dongge et al., *Journal of Chemical Industry and Engineering (CHINA)*, 2005, 56, 10, 4), such as, for example, N-methyl-2-pyrrolidone (NMP), or by its thermal decomposition at high temperature.

Presently, there are two main approaches for the recovery of active electrode materials, also called electrochemically active materials. The first one is based on pyro-metallurgical techniques, in which the battery constituents are subjected to very high temperatures in order to recover elements such as cobalt, nickel or manganese, and in which, so far, lithium and aluminum are not recovered (*Life-cycle analysis for Lithium-ion batteries production and recycling*, Linda Gaines, John, 90$^{th}$ *Annual Meeting of the Transportation Research Board*, Washington D. C, January 2011).

The other approach is based on hydro-metallurgical techniques, mainly acid leaching (or lixiviation), followed by extraction and/or precipitation steps. Known leaching agents used in conventional processes are hydrochloric acid (P. Zhan et al., *Hydrometallurgy*, 47 (1998) 259-271), a mixture of sulfuric acid and hydrogen peroxide (D. P. Mantuano et al., *J. Power Sources*, 159 (2006) 1510-1518), or a mixture of nitric acid and hydrogen peroxide (C. K. Lee, K. I. Rhee, *Hydrometallurgy*, 68 (2003) 5-10).

The main disadvantage of currently proposed hydrometallurgical techniques is that the use of strong acids for leaching leads to a non-selective dissolution of all active electrode components (i.e. lithium and transition metals). This implies the need for several further extraction and/or precipitation steps (S. Castillo et al., *Journal of Power Sources*, 112 (2002) 247-254) in order to recover each element. Furthermore, the above-mentioned strong acids must be used in high concentrations and at relatively high temperatures. In the case of hydrochloric acid, the handling of released chlorine also involves higher operating costs as well as additional environmental issues.

When $LiFePO_4$ is put in contact with a solution of $H_2SO_4$ (4M) at 75° C. in the presence of $H_2O_2$, the entire active electrode material is dissolved as lithium and iron sulfate. This involves additional steps for the selective precipitation of iron, usually by pH adjustment (involving the use of important amounts of hydroxides to neutralize excess acid), followed by lithium recovery, usually by addition of a carbonate such as sodium carbonate or its transformation into lithium hydroxide. The only reported case of selective lithium extraction from used electrode material is based on the use of oxalic acid which also involves the use of a relatively expensive reagent. The method also needs to be carried out at high temperature (i.e. 80° C.) (J. S. Sohn et al., *Advanced Processing of Metals and Materials, Sohn International Symposium, Proceedings*, San Diego, Calif., USA, 27-31 Aug. 2006 (2006), Vol. 6, 135-143).

Therefore, as it may be seen, conventional approaches for the recycling of active electrode materials from used lithium batteries are not selective and involve the use of fairly corrosive reagents, high temperature conditions, and the formation of several by-products, resulting in higher recycling costs.

There is therefore a need for a recycling process involving less aggressive reagents, non-critical conditions, and/or allowing for the selective recycling of the active electrode material.

SUMMARY

According to a first aspect, the present relates to a process for the recycling of an electrochemically active material. The process comprises the steps of: (a) reacting the electrochemically active material with an oxidizing agent or a reducing agent in a solvent (e.g. an aqueous solvent), to produce a lithium salt and an electrochemically active material precursor precipitate; (b) separating the electrochemically active material precursor precipitate from the lithium salt; and (c) regenerating the electrochemically active material from the electrochemically active material precursor. In one embodiment, the solvent is water.

According to one embodiment, step (a) further comprises injecting gaseous $CO_2$ in order to increase the lithium salt solubility in the solvent. According to another embodiment, step (c) comprises heating the lithium salt to recover gaseous $CO_2$ and a recycled lithium salt. According to another embodiment, the oxidizing agent comprises hydrogen peroxide, or ozone, or oxygen. The oxidizing agent may also comprise a persulfate salt.

According to one example, step (c) also comprises submitting the lithium salt to an electrolysis, a sodium salt solution, or a $CO_2$ injection to recover a recycled lithium salt. In some instances, the lithium salt thus recovered is used to regenerate the electrochemically active material.

According to another aspect, the present technology also relates to a method for the recycling of electrode material from lithium batteries, wherein the separated used electrode material is suspended in an aqueous medium and reacted with $CO_2$ in the presence of an oxidizing or reducing agent to selectively and effectively separate the lithium content as lithium bicarbonate and to recover the remaining active electrode material as a solid by a separation method. The separated liquid phase is then treated to recover the lithium content that will be recycled towards the manufacture of new electrode material along with the other electrode material elements recovered from the solid phase.

According to an embodiment, the $CO_2$ pressure in the reactor may vary between 1 and 10 atm, but more preferably between 1 and 5 atm. The reaction mixture may be cooled to below room temperature in order to increase the lithium bicarbonate solubility. The reaction may be carried out between 10 and 30° C., for example, between 20 and 25° C.

According to another embodiment, the oxidizing or reducing agent is hydrogen peroxide, which is used at stoichiometric amounts or slightly in excess with respect to the transition metal to be oxidized or reduced.

According to an example, the separated solid phase contains $FePO_4$ of high purity, the $FePO_4$ maintaining its crystalline structure, thus allowing its reuse in the manufacture of new electrode material.

According to an embodiment, once the solid phase is separated, the liquid phase is heated to high temperatures, preferably around 90° C., in order to recover lithium in the form of a lithium carbonate precipitate. The lithium carbonate precipitate is then dried and reused in the manufacture of electrode material, and the released gaseous $CO_2$ and the solution containing residual lithium carbonate and/or bicarbonate are recycled in the reaction with other used electrode materials.

According to another aspect, the present technology further relates to a method for the recycling of electrode material from lithium batteries, wherein the separated used electrode material is suspended in an aqueous medium and reacted with $Li_2S_2O_8$ to extract lithium from the electrode material as lithium sulfate in the liquid phase, the transition metal oxide remaining in the solid phase. The solid phase is separated by a conventional separation method and reused towards the formation of a new electrode material. The liquid phase is then separated into two fractions. One is used as material added to the anolyte of an electrolytic cell in which the lithium sulfate is oxidized back to lithium persulfate, which will be used again to treat other used battery electrode materials. The other fraction of the liquid phase containing lithium sulfate will be used to recover lithium in the form of other salts such as lithium carbonate (using $CO_2$ or another carbonate salt such as sodium carbonate $Na_2CO_3$) or lithium hydroxide LiOH by salt dissociation electrolysis.

According to one embodiment, the reaction is carried out between 5 and 60° C., or between 20 and 40° C., since at higher temperatures, the persulfate will be less stable.

According to another embodiment, the first fraction of the liquid phase containing lithium sulfate is converted into lithium hydroxide and sulfuric acid by electrolysis. The LiOH is then reacted with ammonium persulfate to produce lithium persulfate which is used to treat other used battery electrode materials.

According to a further embodiment, the reaction between LiOH and $(NH_4)_2S_2O_8$ is carried out under vacuum to facilitate the elimination of gaseous $NH_3$ which is recycled towards the formation of ammonium sulfate which, in turn, is then added to the anolyte of an electrolytic cell to produce ammonium persulfate.

DETAILED DESCRIPTION

This application relates to a process for the recycling of electrochemically active material from lithium batteries. More particularly, the subject of the present application relates to the recovery of electrochemically active components of the electrode material once it has been separated from the rest of the battery elements.

New approaches that achieve a selective extraction of the lithium component from the electrochemically active electrode material, without the use of strong acid or high temperature conditions, are presented hereafter.

In a first aspect, an electrode material recovered from the separation of battery components and comprising the electrochemically active material is contacted with an oxidizing agent or a reducing agent contained in a solvent, optionally in the presence of $CO_2$. This step excludes the presence of a strong acid such as hydrochloric acid, sulfuric acid, nitric acid, etc. The selection of the oxidizing or reducing agent depends on the type of electrode material used. The present process may be adapted to cathode material recycling or to anode material recycling. The first step of the process is therefore the reaction of the electrochemically active material with an oxidizing agent or a reducing agent in a solvent. This produces a lithium salt and an electrochemically active material precursor precipitate (i.e., a totally or partially delithiated electrochemically active material), thereafter referred to as the precursor precipitate. In an embodiment, the mixture comprising the electrochemically active material is dispersed in the solvent. In a preferred embodiment, the solvent is water, and the lithium salt produced is in solution.

The electrochemically active material may be an oxide, a complex oxide, a phosphate, a silicate, etc. For example, it could be $LiFePO_4$, or any other electrochemically active material known to the person skilled in the art. In the case of $LiFePO_4$, the precursor precipitate formed is $FePO_4$. The produced lithium salt may be, for instance, $LiHCO_3$, or $Li_2SO_4$. An example of a useful oxidizing agent is hydrogen peroxide ($H_2O_2$). Other oxidizing agents may be used, such as oxygen ($O_2$), ozone ($O_3$), air, etc. The skilled addressee will recognize that hydrogen peroxide can be used both as an oxidizing and a reducing agent. The oxidizing or reducing agent can be used in stoichiometric amounts or slightly in excess (i.e. an excess of from 5 mol % to 10 mol %) with respect to the transition metal to be oxidized or reduced. The person skilled in the art will appreciate that the oxidizing or reducing agent may, however, be used in larger excess.

Figure 4:
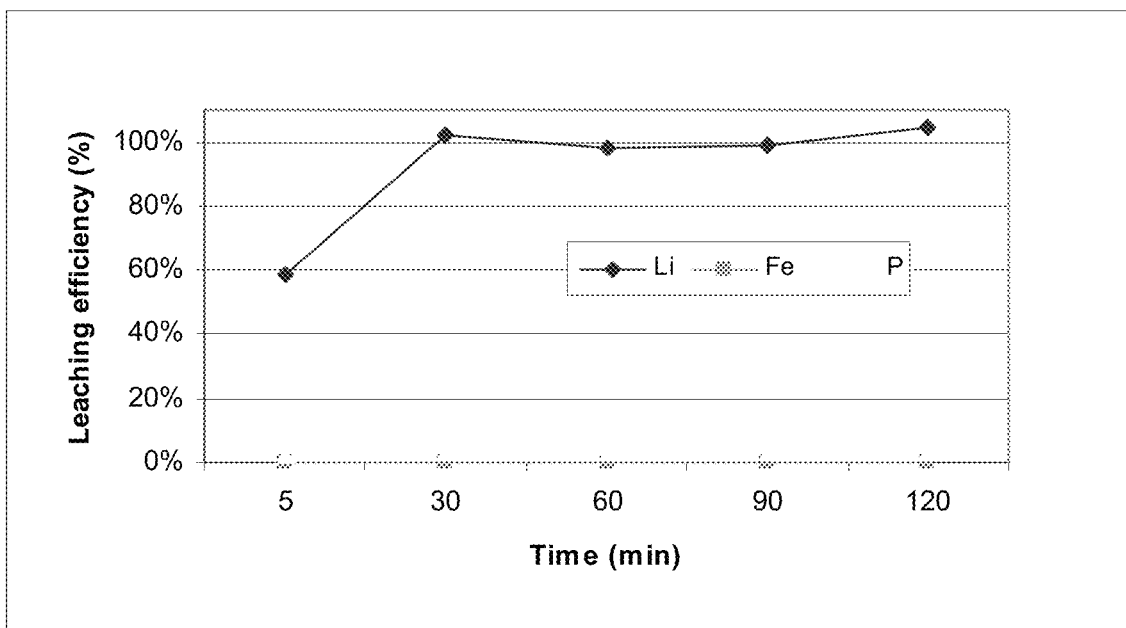
FIG. 4 shows the leaching efficiency for different types of active materials as a function of time in accordance with Example 1 of the description.

The first reaction step of the process may also comprise the injection of $CO_2$ into the solution. $CO_2$ is bubbled in the solution and increases the lithium salt solubility in the solvent. This thereby increases the leaching efficiency of the process. For example, as illustrated in FIG. 4, it has been found that, when a powder containing $LiFePO_4$ reacts with an aqueous solution containing an oxidizing agent such as $H_2O_2$, in the presence of bubbled $CO_2$, the lithium can be leached with extraction rates of up to 100% from the powder, in a very selective manner, for instance, less than 1% of the iron Fe or 4% of the phosphorus P being extracted with the lithium. The precursor precipitate contained in the solid phase, substantially or entirely, maintains its crystalline structure during the reaction step.

Since the kinetics of the reaction between the electrochemically active material and the oxidizing or reducing agent is quite fast at room temperature, there is no need for high temperature conditions. The reaction mixture may be cooled below room temperature in order to increase the lithium bicarbonate solubility. However, for economic reasons, the reaction may be carried out between 10 and 30° C., or between 20 and 25° C. In fact, at higher temperatures, the solubility of the lithium salt (e.g. lithium carbonate) decreases, which requires reactors with higher volumes and a lower lithium recovery. The reaction may be carried out in a reactor at atmospheric pressure or at a higher pressure. It was observed that the solubility of the lithium salt increases with a raise in $CO_2$ pressure. However, at pressures beyond 10 atm., the solubility starts reaching a plateau and there is only a little gain in solubility. Therefore, the reaction pressure will preferably be between 1 and 10 atm.

In a second step, the produced mixture of lithium salt and precursor precipitate is subjected to separation. Since the precursor precipitate remains solid during the reaction, it can be separated from the lithium salt solution by any separation technique known to the person skilled in the art, for example, by filtration or centrifugation.

Once the precursor precipitate and lithium salt are separated, the process comprises the regeneration of the electrochemically active material from said precursor precipitate.

Therefore, in an embodiment of the present technology, the recycling process comprises a regeneration step. The precursor precipitate recovered in the separation step is used for the manufacturing of new lithium electrochemically active materials. In some embodiments, the regeneration step also comprises the recovery of the lithium comprised in the lithium salt. The lithium recovery involves heating the lithium salt recovered from the separation to produce a recycled lithium salt, gaseous $CO_2$ and a residual lithium salt solution. The lithium salt can be heated at a temperature of 50° C. to 100° C., preferably at a temperature of 85° C. to 95° C. In some embodiments, the lithium salt is heated at high temperature, preferably around 90° C. The recycled lithium salt is then used in the manufacturing of new electrochemically active materials, and the recovered gaseous $CO_2$ can be reinjected in the first reaction step of the present process. Finally, the residual lithium salt solution can also be reintroduced in the reaction mixture of the previously mentioned first step.

Figure 1:
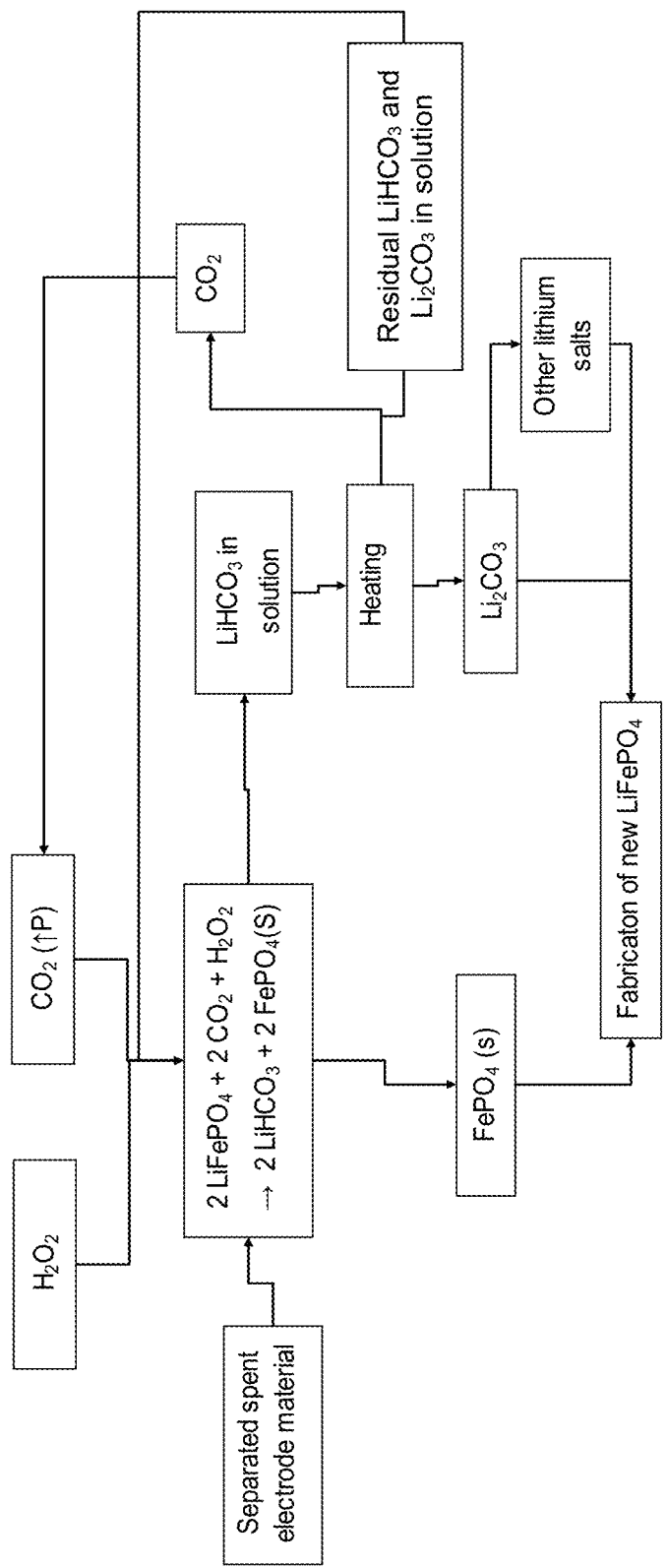
FIG. 1 is a schematic representation of a process according to one embodiment.

In an embodiment of the process, illustrated in FIG. 1, the recovered electrode mixture of a cathode material, which comprises the electrochemically active material $LiFePO_4$, is dispersed in an aqueous solution containing hydrogen peroxide $H_2O_2$, and is treated with $CO_2$ which is bubbled in the suspension. In this case, hydrogen peroxide ($H_2O_2$) acts as an oxidizing agent on $LiFePO_4$ and the lithium contained within is leached as lithium bicarbonate ($LiHCO_3$) according to the following equation:

$$2LiFePO_4(S)+H_2O_2+2CO_2 \rightarrow 2LiHCO_3+2FePO_4(S) \quad (eq.\ 1)$$

The lithium salt is recovered in the liquid phase as lithium bicarbonate, which can be recycled as a lithium salt, for example as a solid lithium carbonate ($Li_2CO_3$) precipitate without the addition of any other chemical reagent.

Figure 2:
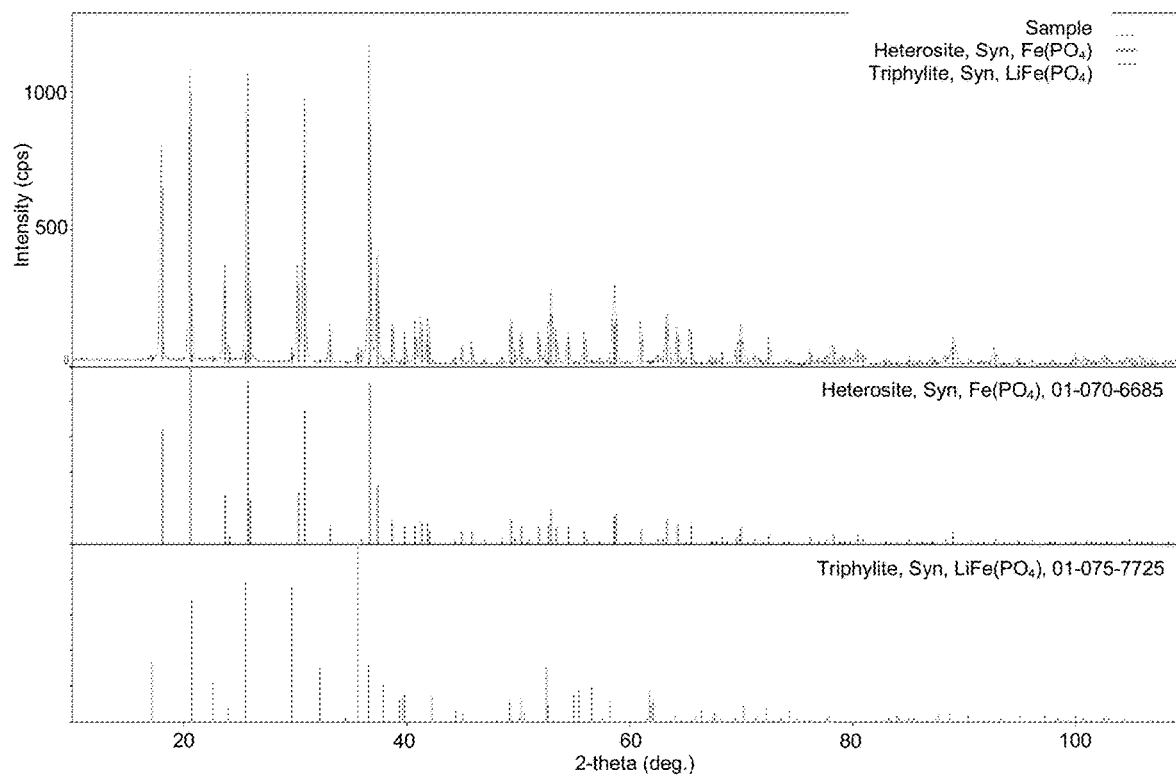
FIG. 2 shows an X-ray diffraction pattern diagram of a sample submitted to the process according to one embodiment.

The iron phosphate ($FePO_4$) formed during the first reaction step remains as a solid and can be separated from the suspension. An X-ray diffraction analysis shows that the $FePO_4$ crystalline structure remains intact, so that this material can be easily returned to the manufacturing of new $LiFePO_4$ cathode material. For example, FIG. 2 shows the X-ray diffraction spectrum, as well as the resulting content table, of a sample that was submitted to a lithium extraction as described herein, using $CO_2$ and $H_2O_2$. The solid separated by filtration shows a 97.3% content in $FePO_4$ and 2.3% content in $LiFePO_4$. The separated lithium salt solution containing lithium bicarbonate $LiHCO_3$ can then be heated in a precipitator to recover solid lithium carbonate $Li_2CO_3$, according to the following equation:

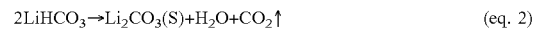

$$2LiHCO_3 \rightarrow Li_2CO_3(S)+H_2O+CO_2\uparrow \quad (eq.\ 2)$$

As illustrated in FIG. 1, residual lithium carbonate and lithium bicarbonate, as well as released $CO_2$, can be reintroduced into the first reaction step (or carbonation step) for the treatment of used electrode material. Alternatively, the lithium bicarbonate may be converted to lithium salts other than lithium carbonate. Such lithium salts can comprise any lithium salt known to the person skilled in the art, depending on the application. The iron phosphate, the lithium carbonate, or other potential lithium salts recovered from the regeneration step, may be used in the manufacture of new electrochemically active electrode materials comprising $LiFePO_4$, for instance, for use in lithium batteries.

In another aspect of the present technology, the electrode material recovered from the separation of the battery components and comprising the electrochemically active material is contacted with an oxidizing or reducing agent contained in a solvent. The oxidizing agent can be a persulfate salt. This contacting produces a lithium salt and an electrochemically active material precursor precipitate (precursor precipitate). In an embodiment, the mixture comprising the electrochemically active material is dispersed in the solvent. The solvent may be water, so that the lithium salt is recovered as a lithium salt solution. The reaction can be carried out between 5° C. and 60° C., but more particularly between 20° C. and 40° C. Indeed, at higher temperatures, the persulfate will be less stable.

In one embodiment, the lithium salt produced during the first reaction step is highly soluble in the solvent, such that it is not necessary to use $CO_2$ to increase the lithium salt solubility.

As previously described, the lithium salt and precursor precipitate produced in the reaction step are submitted to a separation step. Since the precursor precipitate remains in solid state during the reaction, it can be separated from the lithium salt solution by filtration, centrifugation, etc.

Following the separation step, the process comprises the regeneration of the electrochemically active material from the precursor precipitate, which can be used directly in the manufacture of new electrochemically active materials.

In some embodiments, the regeneration step further comprises the recovery of the lithium comprised in the lithium salt. To do so, the lithium salt recovered from the separation step is submitted to an electrolysis, to a sodium salt or to $CO_2$.

In some embodiments, part of the lithium salt is recovered as a persulfate salt and is re-used as oxidizing or reducing agent in the first reaction step. The remainder of the recovered lithium salt may be converted to other lithium salts such as lithium carbonate (using $CO_2$ or sodium carbonate) or lithium hydroxide (by electrolysis) in order to be re-used in the manufacture of lithium battery electrochemically active materials (such as $LiFePO_4$).

In one embodiment, lithium hydroxide may be used to produce lithium persulfate ($Li_2S_2O_8$) through its reaction with ammonium persulfate (($NH_4)_2S_2O_8$). The released ammonia ($NH_3$) can be recovered to form ammonium sulfate (($NH_4)_2SO_4$) through reaction with sulfuric acid obtained from the lithium sulfate ($Li_2SO_4$) electrolysis. The ammonium sulfate formed in this manner can be easily transformed into ammonium persulfate by its direct electrolysis.

Figure 3:
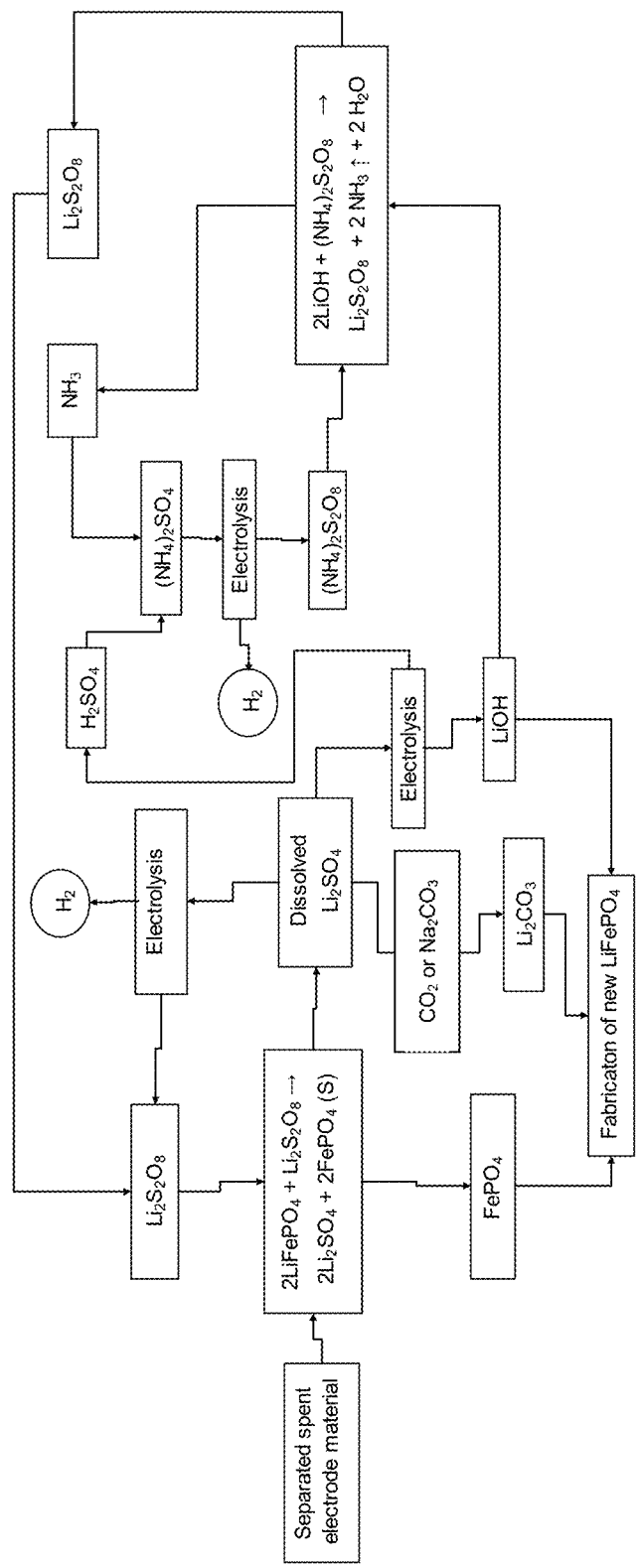
FIG. 3 is a schematic representation of a process according to another embodiment.

In a preferred embodiment, illustrated in FIG. 3, a suspension of used electrode material comprising $LiFePO_4$ is treated with an aqueous lithium persulfate solution, which results in the selective and complete leaching of lithium as lithium sulfate $Li_2SO_4$. As illustrated in FIG. 4, the process results in less than 1% of iron leaching. The iron phosphate mainly remains in the form of a solid in suspension according to the following reaction:

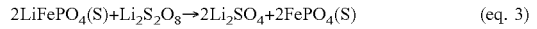

$$2LiFePO_4(S)+Li_2S_2O_8 \rightarrow 2Li_2SO_4+2FePO_4(S) \qquad (eq. 3)$$

Regarding FIG. 3, the iron phosphate formed during the first reaction step remains in solid form, which can be separated from the suspension and easily reused in the manufacture of new $LiFePO_4$ cathode material. The lithium sulfate solution is then recycled to produce other lithium salts such as lithium carbonate (by addition of sodium carbonate or by using $CO_2$), or lithium hydroxide, by electrolysis in a salt dissociation operation. As illustrated in FIG. 3, lithium sulfate electrolysis produces lithium hydroxide and sulfuric acid. In addition, part of the obtained lithium salt may be used to regenerate the lithium persulfate and be reintroduced into the process. The lithium persulfate regeneration may be done through the lithium sulfate direct electrolysis on the anodic side of an electrolytic cell adapted to persulfate production. The lithium persulfate may also be regenerated through the reaction between part of the produced LiOH and ammonium persulfate, according to the following reaction:

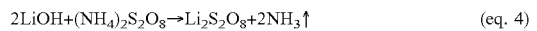

$$2LiOH+(NH_4)_2S_2O_8 \rightarrow Li_2S_2O_8+2NH_3\uparrow \qquad (eq. 4)$$

The above reaction is carried out under vacuum, and preferably with an inert gas bubbling into the solution, in order to quickly evacuate the released gaseous ammonia and to minimise its reaction with the ammonium persulfate. The ammonia can be recycled and used in the formation of ammonium sulfate by its reaction with the sulfuric acid formed during the electrolytic transformation of lithium sulfate into lithium hydroxide. The ammonium sulfate is then used in the electrolytic production of ammonium persulfate that is then used for producing lithium persulfate according to equation 4.

The following examples are for illustrative purposes and should in no way be interpreted to limit the scope of the invention as described in the present application.

EXAMPLES

Example 1

In order to simulate the application of the proposed lixiviation (or leaching) conditions based on the use of gaseous $CO_2$ and an oxidizing agent, a new cathode material mainly containing $LiFePO_4$ along with small amounts of polyvinylidene fluoride (PVDF) and graphite, was used to represent the recovered used electrode material. One part of this material was dispersed in 100 parts of an aqueous solution containing 0.5 wt % of $H_2O_2$ in an agitated reactor, $CO_2$ gas being bubbled into the aqueous solution, under a pressure of 30 psi, and at 25° C. The $LiFePO_4/H_2O_2$ molar ratio was therefore of 2.77. Samples were collected every 30 minutes and the concentration of Li, Fe, and P in the solution were determined by inductively coupled plasma (ICP) analysis. The results were then used to calculate the leaching efficiency of the process towards each element. Those results are presented in FIG. 4. It was found that after 30 minutes, all of the lithium content from the electrode material had been dissolved as lithium bicarbonate whereas less than 0.5% of iron and 3.5% of phosphorus were extracted. This demonstrates the very high selectivity and efficiency of the present process for lithium leaching.

When the same reaction was carried out in the presence of the same $LiFePO_4/H_2O_2$ ratio but in absence of $CO_2$, only 3% of lithium was extracted. In addition, when $CO_2$ alone was used to treat the electrode material, even at a $CO_2$ pressure of 75 psi, only 12% of lithium was extracted (see table 1 below). These results demonstrate that the presence of both $CO_2$ and $H_2O_2$ is essential for the high efficiency of lithium leaching. In all cases, the extraction is very selective towards lithium, as evidenced by the leaching efficiencies for Li and Fe in table 1.

TABLE 1

| Leaching conditions | Li leaching efficiency (%) | Fe leaching efficiency (%) |
|---|---|---|
| Leaching with $H_2O_2$ | 3% | <0.1% |
| Leaching with $CO_2$ | 12% | 0.2% |
| Leaching with $CO_2$ and $H_2O_2$ | 100% | 0.3% |

Example 2

Figure 5:
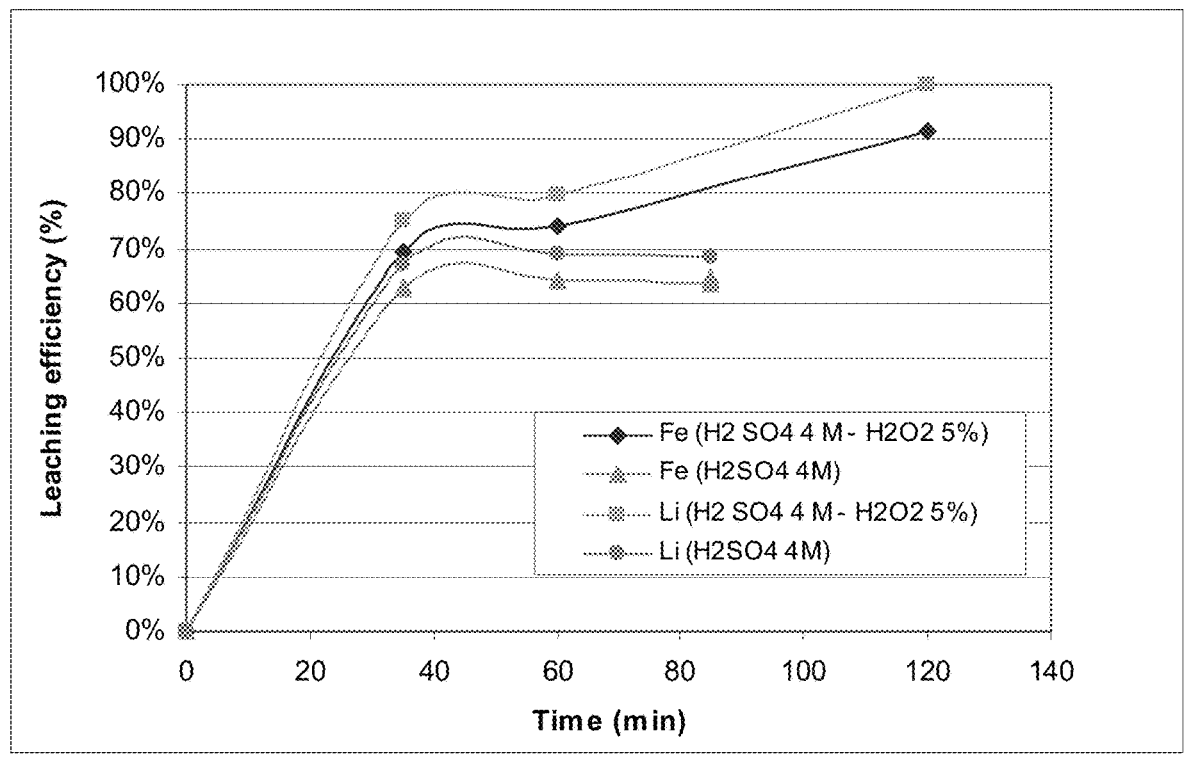
FIG. 5 shows the leaching efficiency for different types of active materials as a function of time in accordance with Example 2 of the description.

For comparative purposes, the same reaction was carried out with sulfuric acid instead of $CO_2$. One part of a cathode material containing $LiFePO_4$ was added to a 4M $H_2SO_4$ aqueous solution under two different conditions, one in the presence of 5 wt % $H_2O_2$ and the other in the absence of $H_2O_2$. In both cases the suspension was heated to 75° C. under agitation, and filtered samples from the aqueous phase were analysed by ICP to determine the Li and Fe content at different time intervals. As illustrated in FIG. 5, in the case without $H_2O_2$ only 70% of the lithium is extracted, whereas the addition of $H_2O_2$ allows to reach 100% lithium extraction efficiency. However, in both cases important amounts of $FePO_4$ (65% to 90%) are also leached into the solution, indicating an absolute lack of selectivity between Li and Fe extraction. Therefore, in the presence of a strong acid such as sulfuric acid, the separation of iron from lithium requires the application of additional chemical reagents and steps (such as controlled pH adjustment and filtration steps) after the lithium recovery step. Furthermore, unlike the present process, the recovered iron needs to be converted back to $FePO_4$ before its use to make a new electrode material.

Example 3

Figure 6:
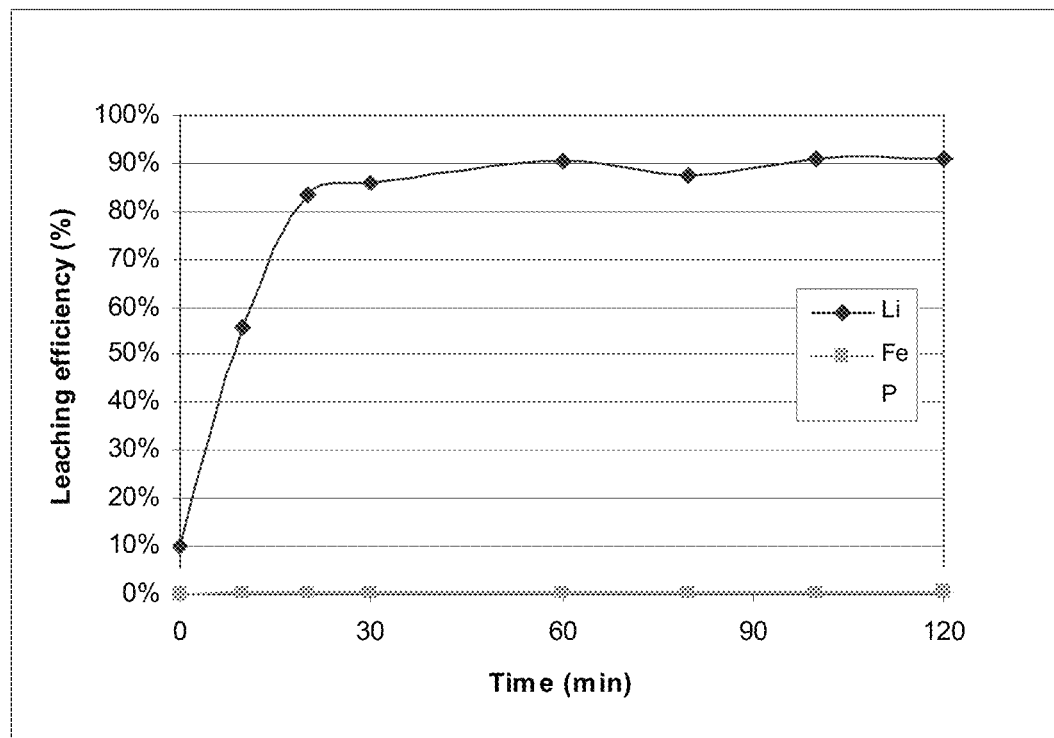
FIG. 6 shows the leaching efficiency for different types of active materials as a function of time in accordance with Example 3 of the description.

The experiment presented in Example 1 was repeated but this time with five times the amount of solid. Therefore, 5 parts of cathode material were suspended into 100 parts of an aqueous solution containing 0.5 wt % of $H_2O_2$ in an agitated reactor, $CO_2$ gas being bubbled into the solution under a pressure of 30 psi and at 25° C. In this case, the $LiFePO_4/H_2O_2$ molar ratio was 0.55, which only represents a slight excess of 10% in terms of the stoichiometric amount of $H_2O_2$ needed for a complete leaching of Li. FIG. 6 presents the leaching efficiency results for Li, Fe and P. The total leaching efficiency for lithium was above 92%, whereas the leaching efficiency for Fe was of 1%. This again confirms the high efficiency and very high selectivity of the present process for lithium extraction, as well as the possibility of recovering nearly all of the $FePO_4$ for the manufacture of new electrode materials. As described herein, the filtrate from this operation, which contains the lithium salt solution, can then be heated to recover the extracted lithium as a lithium carbonate $Li_2CO_3$ precipitate, which is then used along with the recovered $FePO_4$ to manufacture new electrode material.

Comparison of examples 1 and 3 results confirms that the amount of oxidizing or reducing agent can be kept around stoichiometric ratio. A stoichiometric excess of only 10% allows for lithium leaching efficiency of more than 92%. The person skilled in the art will understand that, for economic reasons, and since excess amounts of oxidizing or reducing agent may be lost in subsequent steps of the present process, said agent may be kept at or very close to the stoichiometric ratio.

Example 4

In order to validate that a high leaching efficiency can still be reached at even higher solid/liquid ratios, the experiment of example 3 was modified using 10 parts of cathode material suspended in 100 parts of an aqueous solution containing 1 wt % of $H_2O_2$, with a $CO_2$ pressure of 30 psi. Once more, Li leaching efficiencies of around 90% were obtained, whereas the operation resulted in leaching rates of less than 0.5% for Fe and less than 2.5% for P.

This again confirms the high selectivity of the present lithium extraction process. Additionally, since the $FePO_4$ solid is kept intact, it can be easily recovered by simple filtration. In fact, the X-Ray diffraction analysis of the filtered solid phase showed a content of 97.7% $FePO_4$ and 2.7% $LiFePO_4$, suggesting an even higher Li leaching efficiency (see FIG. 2).

Example 5

In this example, 7.5 parts of solid LiOH were dissolved in 100 parts of water and added to an agitated reactor containing an aqueous solution of 35.5 parts of $(NH_4)_2S_2O_8$ in 150 parts of water. The mixture was stirred for 3 hours, the reactor being under a vacuum to facilitate the evacuation of released gaseous $NH_3$. The $Li_2S_2O_8$ formation and $NH_3$ elimination were monitored by observing the solution pH which decreased from 14 to around 10, indicating the presence of very small amounts of $NH_3$ and thereby confirming the completion of the reaction according to the following equation:

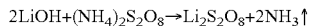

Figure 7:
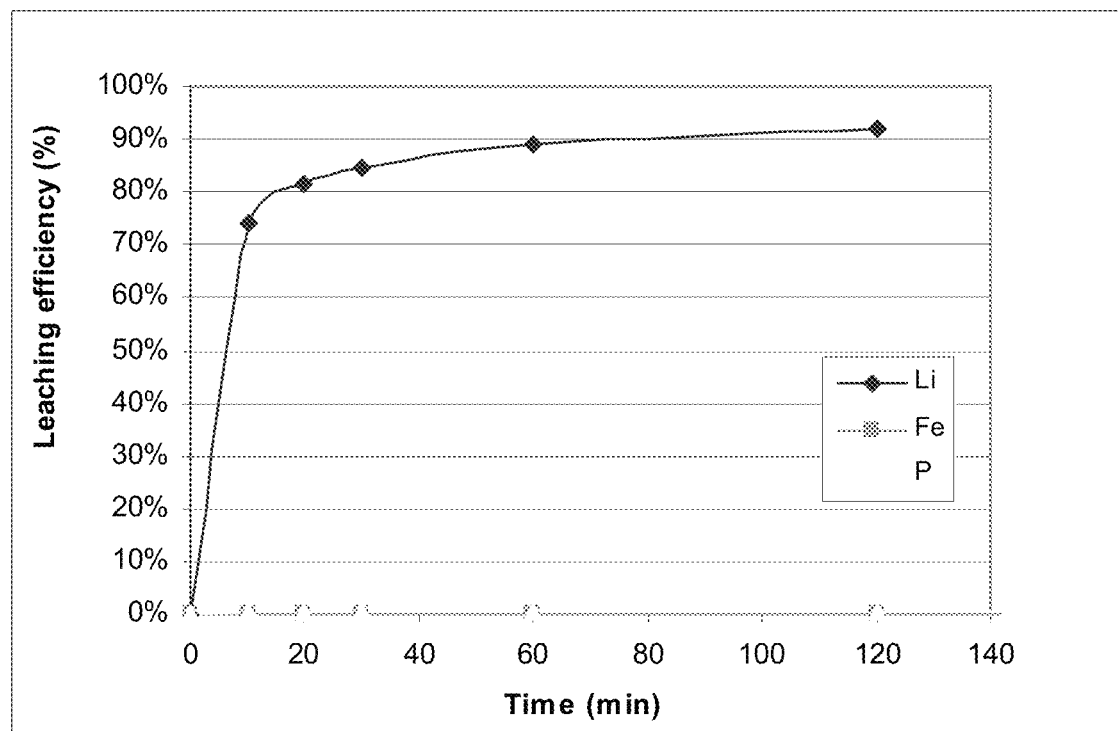
FIG. 7 shows the leaching efficiency for different types of active materials as a function of time in accordance with Example 5 of the description.

The $Li_2S_2O_8$ containing solution was then used to treat 21 parts of cathode material. As it may be seen from FIG. 7, after 2 hours, 92% of the lithium were extracted from the cathode material whereas less than 1% of P and almost no Fe were found in the solution, again demonstrating a very high selectivity for lithium extraction, as for $H_2O_2$ and $CO_2$.

X-ray diffraction analysis of the filtered solid confirmed the recovery of Fe and P as $FePO_4$ in the solid phase (a $FePO_4$ content above 99.7%).

Example 6

Figure 8:
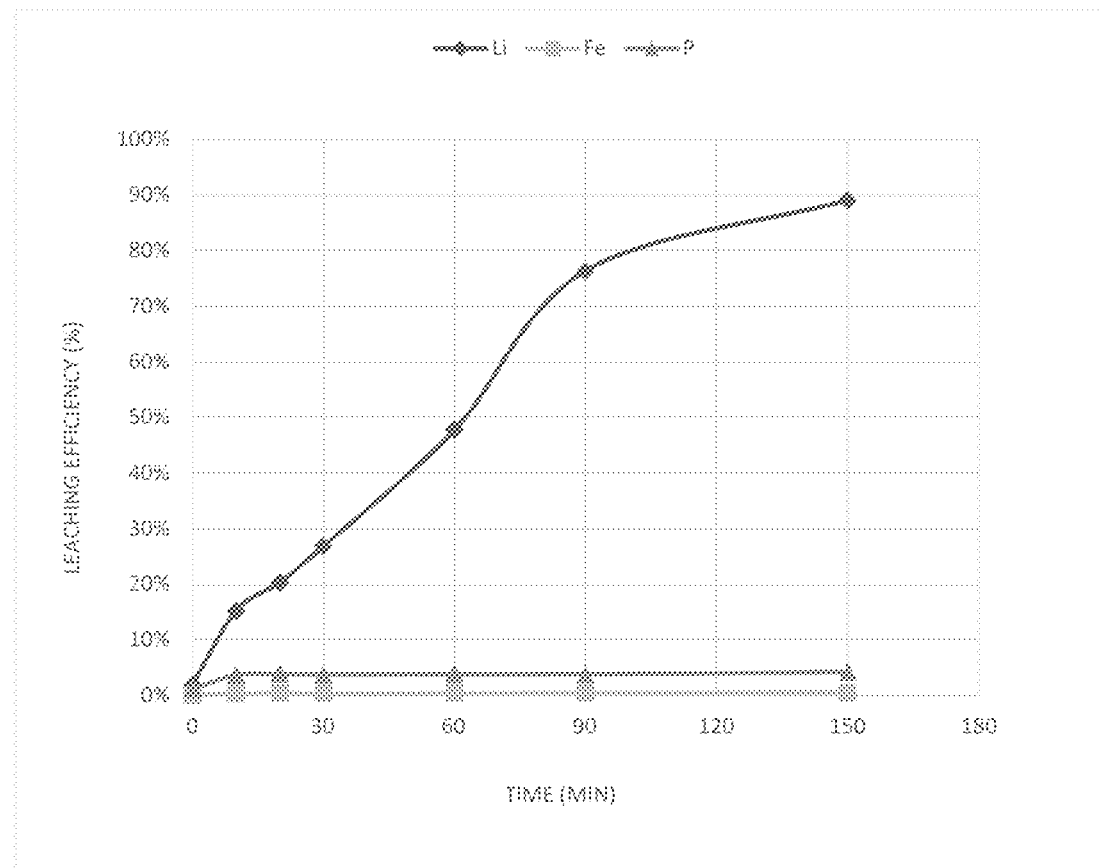
FIG. 8 shows the leaching efficiency for different types of active materials as a function of time in accordance with Example 6 of the description.

The experiment presented in Example 1 was repeated by dispersing one part of the same type of cathode material mainly containing $LiFePO_4$, in 100 parts of water, and agitating and bubbling of $CO_2$ gas, all in a reactor. This time, the hydrogen peroxide was replaced with ozone as oxidizing agent. Gaseous ozone (generated by an ozone generator fed with oxygen) was injected into the aqueous dispersion at a rate of about 4 gr/h. The reactor pressure was maintained at 5 psi and the reaction temperature was of about 25° C. As can be observed in FIG. 8, the ICP analysis of samples collected every 30 minutes shows that after 150 minutes, about 90% of the lithium was extracted as $LiHCO_3$. The fact that no more than 0.5% of iron and less than 4.5% of phosphorus were extracted during the same period shows that the method is very selective as well as very efficient.

Example 7

Figure 9:
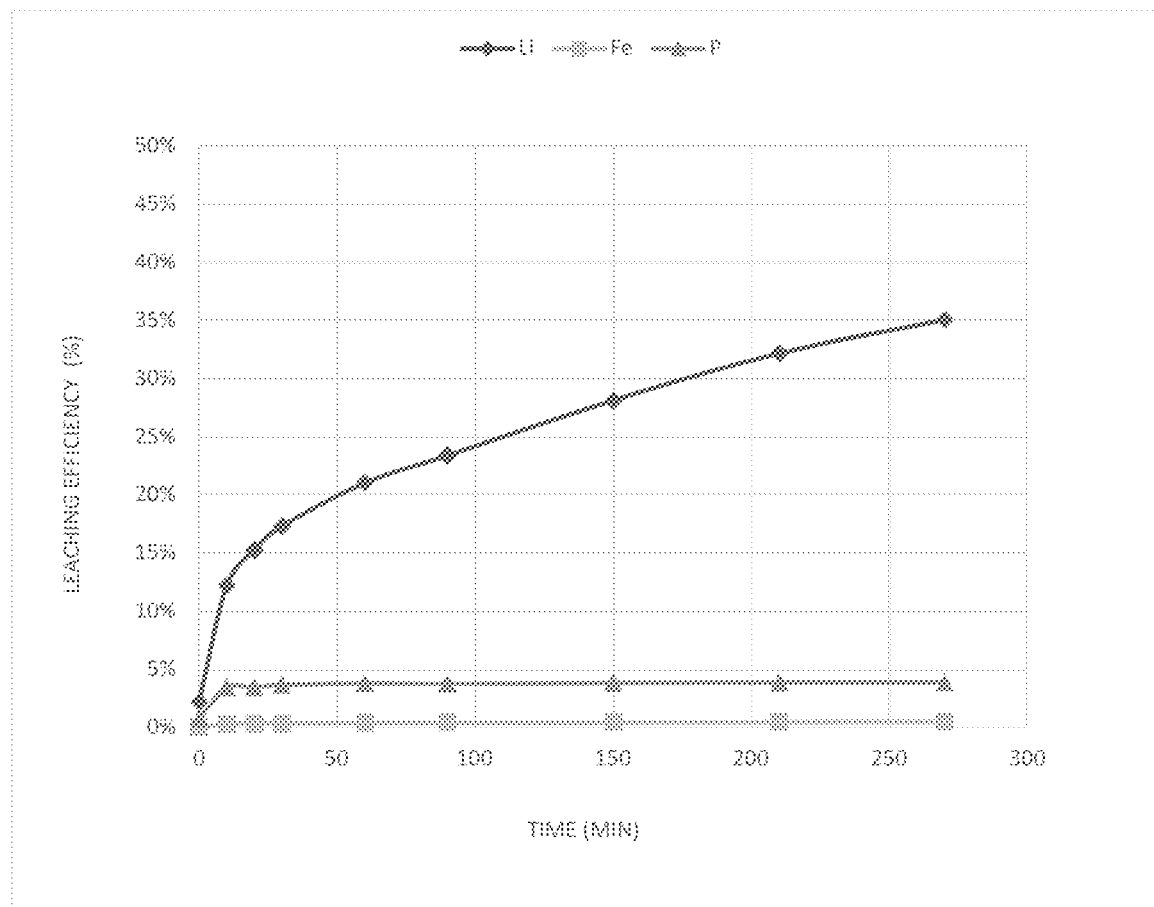
FIG. 9 shows the leaching efficiency for different types of active materials as a function of time in accordance with Example 7 of the description.

The test presented in Example 6 was repeated using a different oxidizing agent, in this case, gaseous oxygen. Here again, one part of the same type of cathode material mainly containing $LiFePO_4$ was dispersed in 100 parts of water, the dispersion being stirred in a reactor. Gaseous oxygen and $CO_2$ were bubbled into the reactor at a flow rate of about 1.8 L/min while maintaining the reactor pressure at 30 psi and its temperature at about 25° C. The Li, Fe and P leaching efficiency as a function of time is presented in FIG. 9. It can be observed that the use of gaseous oxygen allows to obtain a selective extraction of Li since its extraction percentage increases constantly while the reaction progresses (reaching over 35% after 270 minutes) whereas extraction percentages for Fe and P rapidly reach a plateau and stay at about 0.5% for iron and less than 4% for phosphorus. Reaction kinetics seem to be slower than with ozone or $H_2O_2$, probably due to the much lower solubility of gaseous oxygen in water. On the other hand, these results show the feasibility of the reaction using gaseous oxygen as oxidizing agent. It is clear that the reaction kinetics and extraction efficiency can be increased by conventional means used in the improvement of gas dispersion in a reactor.

Example 8

Figure 10:
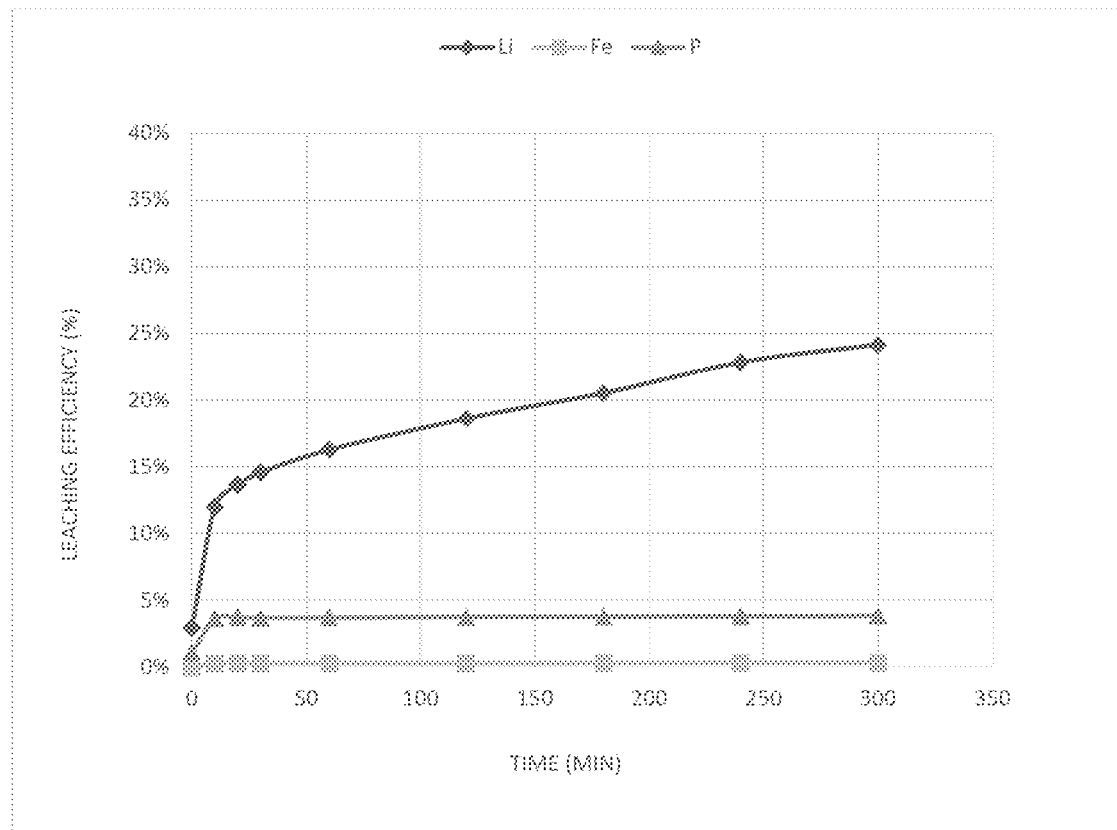
FIG. 10 shows the leaching efficiency for different types of active materials as a function of time in accordance with Example 8 of the description.

The experiment presented at Example 7 was repeated under the same conditions but in replacing oxygen with air as oxidizing agent. The results (presented in FIG. 10) further demonstrate the feasibility of selective lithium extraction, although the kinetic is slower than those obtained with oxygen since the leaching efficiency was of approximately 24% after 300 minutes of reaction. Again, the leaching rates of Fe and P were very low (less than 0.4% and 4%, respectively) which confirms the high selectivity of Li extraction. As for oxygen, the results confirm that selective Li extraction is entirely possible using air as an oxidizing agent.

Therefore, the present process provides a selective and efficient leaching of lithium comprised in a recovered used electrode material, without the use of strong acid or critical pressure and temperature conditions. This allows for the regeneration of the electrochemically active material of lithium batteries at lower economic and environmental costs, compared to conventional methods.

Numerous modifications could be made to one or the other of the above-mentioned embodiments without departing from the scope of the present invention. The references, patent or documents from scientific literature mentioned in the present application are incorporated herein by reference in their entirety and for all purposes.

The invention claimed is:

1. Process for the recycling of an electrochemically active material, the process comprising the steps of:
   a) reacting the electrochemically active material with an oxidizing agent or a reducing agent in a solvent excluding the presence of a strong acid to produce a lithium salt in solution and an electrochemically active material precursor solid;
   b) separating the electrochemically active material precursor solid from the lithium salt in solution; and
   c) regenerating the electrochemically active material from the electrochemically active material precursor solid, the electrochemically active material precursor solid having been separated from the lithium salt in solution, wherein the electrochemically active material precursor solid remains solid during step a) and b).

2. The process of claim 1, wherein step (a) further comprises injecting gaseous $CO_2$.

3. The process of claim 1, wherein the lithium salt contains lithium bicarbonate and the process further comprises heating the lithium salt in solution to generate gaseous $CO_2$ and recovering gaseous $CO_2$ and a recycled lithium salt.

4. The process of claim 1, wherein the oxidizing agent comprises hydrogen peroxide.

5. The process of claim 1, wherein the oxidizing agent comprises ozone.

6. The process of claim 1, wherein the oxidizing agent comprises oxygen.

7. The process of claim 1, wherein the oxidizing agent comprises a persulfate salt.

8. The process of claim 7, further comprising after step (b) a step of submitting the lithium salt to an electrolysis, a sodium salt solution, or a $CO_2$ injection, and recovering a recycled lithium salt.

9. The process of claim 3, wherein the recycled lithium salt is used to regenerate the electrochemically active material.

10. The process of claim 1, wherein the solvent is water.

11. Process for the recycling of an active electrode material of a lithium battery, the process comprising the steps of:
   reacting the active electrode material with $CO_2$ in an aqueous medium and in the presence of an oxidizing or reducing agent without strong acid addition, in order to separate the lithium content as lithium bicarbonate in a liquid phase and to recover a totally or partially delithiated active electrode material as a solid phase; and
   treating the liquid phase to recover a lithium salt for recycling in the manufacture of new electrode material by reacting with the totally or partially delithiated active electrode material recovered from the solid phase.

12. The process of claim 11, wherein the $CO_2$ pressure is between 1 and 10 atm.

13. The process of claim 12, wherein the $CO_2$ pressure is between 1 and 5 atm.

14. The process of claim 11, wherein the reaction temperature is between 10 and 30° C.

15. The process of claim 14, wherein the reaction temperature is between 20 and 25° C.

16. The process of claim 11, wherein the reaction temperature is below room temperature.

17. The process of claim 11, wherein the oxidizing or reducing agent is hydrogen peroxide, said hydrogen peroxide being used in stoichiometric or slight excess amount with respect to the quantity of active electrode material.

18. The process of claim 11, wherein the active electrode material is $LiFePO_4$, wherein the solid phase contains $FePO_4$ at high purity, the $FePO_4$ maintaining its crystalline structure.

19. The process of claim 11, wherein the liquid phase is heated to high temperature, forming a lithium carbonate precipitate, $CO_2$ gas and a solution containing residual lithium carbonate and bicarbonate, wherein the lithium carbonate precipitate is separated, dried and recycled in the manufacture of new active electrode material, and wherein the released $CO_2$ gas and a solution containing residual lithium carbonate and bicarbonate are used in the process for the recycling of active electrode material.

20. The process of claim 19, wherein the liquid phase is heated to a temperature of 85° C. to 95° C.

21. Process for the recycling of active electrode material from a lithium battery, the process comprising the steps of:
   reacting the active electrode material with lithium persulfate in an aqueous medium to form a liquid phase containing lithium sulfate in solution and a solid phase comprising a transition metal oxide;
   separating the solid phase for recycling towards the manufacture of new active electrode material; and
   recovering the liquid phase.

22. The process of claim 21, wherein the recovered liquid phase is separated into a first and a second fractions, wherein:
   the first fraction is used as material added to an anolyte of an electrolytic cell in which the lithium sulfate is re-oxidized to lithium persulfate for reuse in the treatment of other active electrode materials; and
   the second fraction is used to recover the lithium as lithium carbonate, by treatment with $CO_2$ or with a carbonate salt, or as lithium hydroxide, by salt dissociation electrolysis.

23. The process of claim 21, wherein the reaction is carried out between 5 and 60° C.

24. The process of claim 23, wherein the reaction is carried out between 20 and 40° C. in order to keep the lithium persulfate stable.

25. The process of claim 22, wherein the first fraction is converted into lithium hydroxide and sulfuric acid by electrolysis, the lithium hydroxide being further reacted with ammonium persulfate to produce lithium persulfate.

26. The process of claim 25, wherein the reaction between the lithium hydroxide and the ammonium persulfate is carried out under vacuum, and wherein gaseous $NH_3$ is generated, recovered and recycled in the formation of ammonium sulfate, said ammonium sulfate being added to the anolyte of an electrolytic cell to produce ammonium persulfate.

* * * * *